July 27, 1926.
H. G. HEROLD ET AL
TRIAL FRAME
Filed Oct. 29, 1924
1,594,196
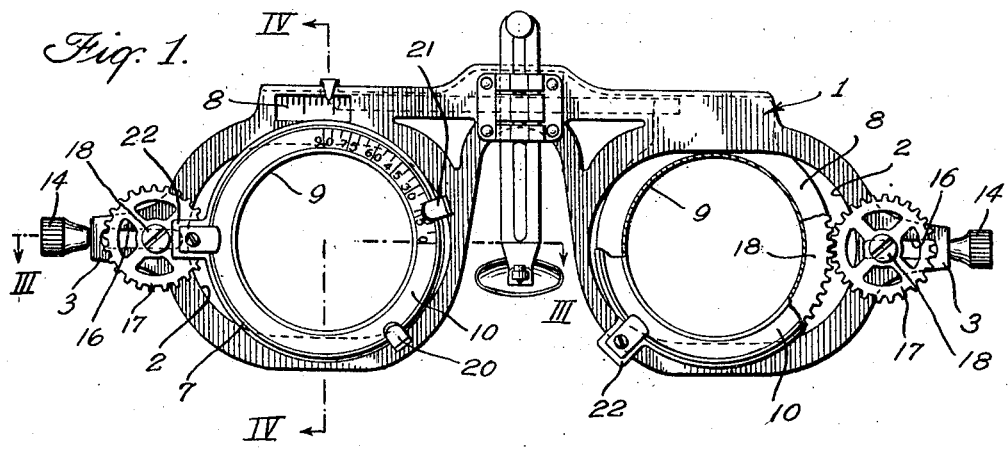
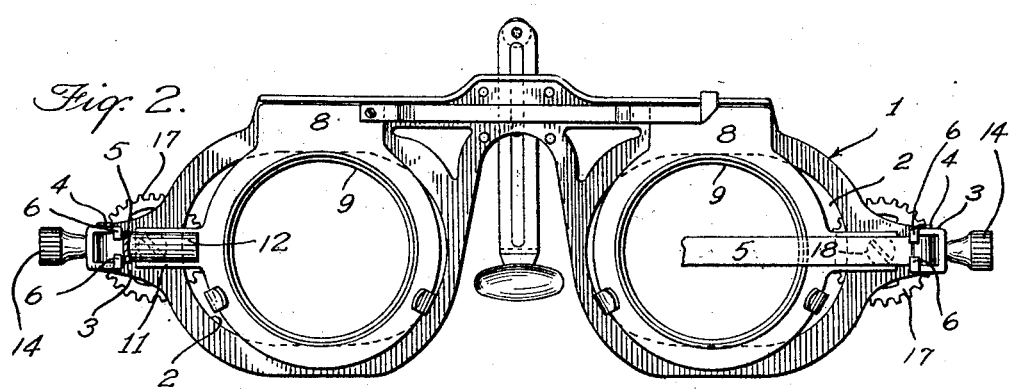
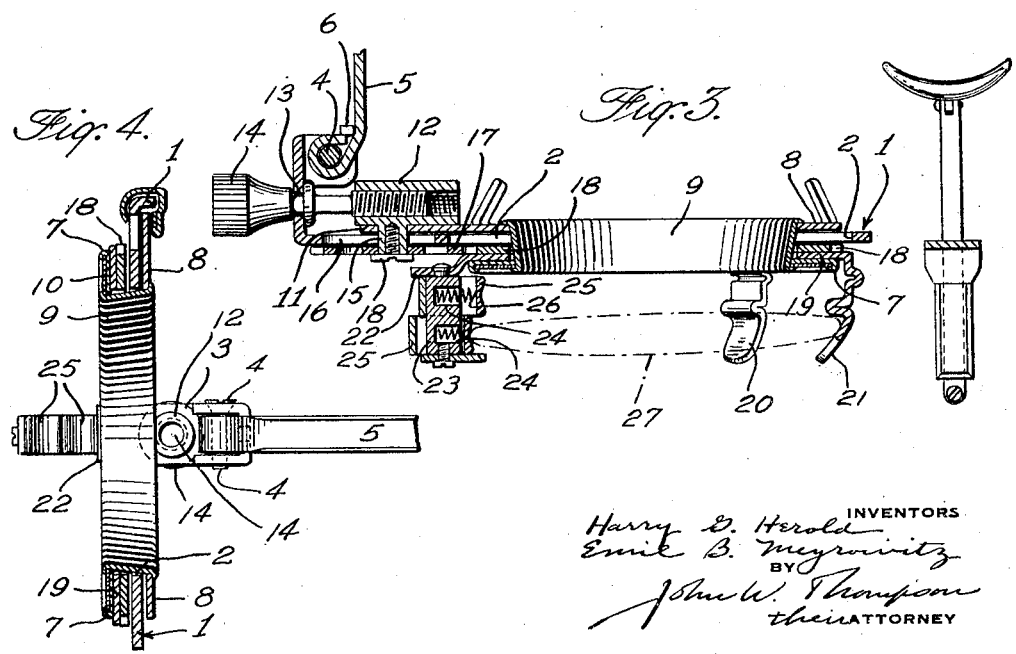

Patented July 27, 1926.

1,594,196

UNITED STATES PATENT OFFICE.

HARRY G. HEROLD, OF HASBROUCK HEIGHTS, NEW JERSEY, AND EMIL B. MEYROWITZ, OF NEW YORK, N. Y., ASSIGNORS TO E. B. MEYROWITZ SURGICAL INSTRUMENTS CO. INC., OF NEW YORK, N. Y., A CORPORATION OF NEW YORK.

TRIAL FRAME.

Application filed October 29, 1924. Serial No. 746,506.

The present invention relates to an improvement in trial frames for eye glass lenses, one object of which has been to effectively combine lens holder rotating and reciprocating devices in an accurate and easily operated unit. In some respects this invention is an improvement over the invention described and claimed in our prior Letters Patent No. 1,481,007, dated January 15, 1924. In this patent the lens holders are shown and described as being slidably mounted for lateral movement with respect to the support. However, no provision was made for readily rotating the lens or lens holder. It is contemplated that the present invention will overcome this partial defect in our previous invention and will at the same time provide means for rotating the lens holder, which will render the manipulation thereof much more simple and accurate than is possible with other devices designed for a similar purpose. For example, in one well known form of construction the heads of the manually operated set screws for actuating the rotative and reciprocative movements respectively of the lens holder are so separated that the operation of one of the set screws is likely to cause a disarrangement of that portion of the device effected by the other set screw. In other words, where the operator has set the instrument for interpupilary distance, he is likely to disarrange this setting when he manipulates the lens holder rotating mechanism. With our improved device the two manually operated parts are so positioned and related that the interpupilary setting can readily be maintained while the rotative adjustment is being made.

One embodiment of our invention is illustrated in the drawings accompanying the present specification and in which Figure 1, is a front elevation with portions broken away.

Figure 2, a rear elevation,

Figure 3, a section substantially on the line III—III of Figure 1; and

Figure 4, a section on the line IV—IV of Figure 1.

The drawings disclose, as an illustrated embodiment of our invention, a trial frame comprising a main support or base 1 having lens-carrier receiving and guiding apertures 2. Adjacent to the outer edge of each aperture is a lug 3 formed integrally with the base 1 and having its end portion bent rearwardly to form a box. A pin 4 is mounted in the box and is pivotally engaged by a temple 5. Terminal portions of the lug are deformed to provide stops or detents 6 arranged to limit the extent of lateral deflection of temple 5.

Each lens-carrier comprises a front plate 7 and a rear plate 8, both being rigidly connected to an annular central member or bushing 9 which is preferably of a truncated cone shape. As indicated more clearly in Figure 4, the forward and rearward edges thereof are flanged and engage respectively the front plate 7 and the rear plate 8. The bushing 9 passes through the aperture 1 and a portion of its peripheral surface is slidably supported and guided by interior edge portions of said aperture 2. As shown in Figures 1 and 4, the front plate carries an annular ring 10 bearing markings indicating units of angular measurement. As indicated in Figures 2 and 3, the rear plate 8 is provided with an outwardly and laterally extended lug 11 to which is secured member 12 having a threaded recess, said recess being in alignment with an opening 13 in the rearwardly extending portion of lug 3. A set screw 14 has a threaded portion engaging said opening 13 and cooperates with the threaded recess of the member 12 to effect reciprocating lateral movement of the rear plate 8 and consequently of the lens-carrier. The rear plate 8, or rather the lug 11 thereof, carries a projection or spindle 15 extending through and guided by the edges of a slot 16 arranged longitudinally in the lug 3 of the main support or base 1. A pinion 17 is mounted on the spindle 15, and is so positioned that portions of its periphery are exposed beyond the outer edges of the main frame 1 so that the pinion may readily be actuated by the thumb or forefinger of the operator. As indicated in the drawings the spindle 15 and the thumb screw 14 lie in substantially the same horizontal plane. Furthermore, the pinion 17 is positioned adjacent to the head of the set screw 14 so that said pinion can be rotated without making it necessary for the operator to remove his hand entirely from the head of the set screw.

The pinion 17 meshes with a pinion 18, which is secured to and actuates lens-holding means, including in the present embodiment an apertured plate 19 mounted for rotation on the bushing 9 and provided with a plurality of lens engaging fingers 20 and 21 positioned at one side of the bushing 9 and a bracket 22 positioned at the opposite side thereof and carrying a post 23 having recesses 24. A pair of lens engaging members 25 are slidably mounted contiguous to each other on said post 23. A spring 26 is interposed between each sliding member 25 and its corresponding recess 24, so that the sliding member is normally held with its lens engaging end extending inwardly. As indicated in Figure 3, when a lens, as 27, is inserted in the carrier by being placed in engagement with the fingers 20 and 21 and the sliding member 25, the lens engaging portion of the latter will yield outwardly or toward the box 23, thus effectively retaining the lens in operative position.

In operation the device as shown in Figure 1 is placed in position and the adjustment for interpupilary distance will be made by means of the set screw 14. The operator may then or previously fix a trial lens or lenses in position engaging the lens retainers and, without removing his thumb, for example, from the head of the set screw may, by means of his index finger rotate the lens holder through the pinions 17 and 18 until he obtains the necessary angular readings by reference to the scale markings on the ring 10.

We claim as our invention:

1. A trial frame for fitting eye glass lenses comprising a support having spaced apertures and a lens carrier mounted theron and including a front portion, a rear portion, an annular member extending through an aperture of said support and connecting said front and rear portions, a lens holding device rotatably mounted on said annular member, and means for manually effecting rotation of said holder relatively to said annular member.

2. A lens carrier for trial frames comprising a front apertured member and a rear apertured member spaced therefrom an annular connecting member having peripheral portions engaging said front and rear members and secured thereto, a lens holder rotatably mounted on said annular member, and means for manually actuating said 3. A lens carrier for trial frames comprising a front apertured member and a rear apertured member spaced therefrom, an annular connecting member having peripheral portions engaging said front and rear members and secured thereto, a lens holder rotatably mounted on said annular member between said front and rear members and means for manually actuating said holder.

4. A lens carrier for trial frames comprising a front apertured member and a rear apertured member spaced therefrom, an annular connecting member having peripheral portions engaging said front and rear members and secured thereto, a lens holder rotatably mounted on said annular member, and means mounted on the rear member for manually actuating said holder.

5. A lens holder for trial frames comprising a rotatable apertured annular plate, a plurality of lens engaging fingers disposed adjacent to the periphery of said plate, a post mounted opposite said fingers, and means mounted on and yieldable toward said post for engaging a lens and retaining the same in operative position with respect to said lens engaging fingers.

6. A lens holder for trial frames comprising a rotatable apertured annular plate, a plurality of lens engaging fingers disposed adjacent to the periphery of said plate, a post mounted opposite said fingers, and means slidably mounted on and yieldable toward said post for engaging a lens and retaining the same in operative position with respect to said lens engaging fingers.

7. A lens holder for trial frames comprising a rotatable apertured, annular plate peripherally disposed means for engaging edge portions of a lens, a post opposite said lens engaging means, and means mounted on and yieldable toward said post for engaging and retaining a lens in effective engagement with said peripherally disposed means.

8. A lens holder for trial frames comprising a rotatable apertured annular plate, peripherally disposed means for engaging edge portions of a lens, a post disposed opposite said lens engaging means and having a recess, a lens engaging member slidably mounted on said post, and a spring having one end engaging said recess and the other end bearing against an inner portion of said lens engaging member.

9. In a trial frame for fitting eye glass lenses the combination of a support having spaced apertures and a radially directed slot adjacent each aperture, and lens carrying means for each aperture, said means comprising an annular bushing slidably mounted to engage interiorly disposed edge portions of said aperture, a rear plate and a front plate spaced therefrom and secured to said bushing, a lens holder and means for rotating the same including a spindle mounted on said rear plate and extending through said slot, and a manually operable holder actuating member rotatably mounted on the spindle.

10. In a trial frame for fitting eye glasses the combination of a support, a reciprocable carrier mounted thereon, a rotatable lens holder on said carrier, a lug extending laterally from said support and having a longitudinal slot, a lens holder driving pinion mounted on said spindle, and a lens carrier actuating set screw extending through the lug and disposed opposite to and parallel with the slot.

In testimony whereof, we have signed our names to this specification this 15th day of October, 1924.

HARRY G. HEROLD.
EMIL B. MEYROWITZ.